(12) United States Patent
Uchihara et al.

(10) Patent No.: US 9,695,911 B2
(45) Date of Patent: Jul. 4, 2017

(54) OIL SEAL CAP AND ECCENTRIC OSCILLATION-TYPE GEAR DEVICE INCLUDING THE SAME

(71) Applicant: NABTESCO CORPORATION, Tokyo (JP)

(72) Inventors: Masato Uchihara, Tsu (JP); Kohei Nagahara, Tsu (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 15/088,706

(22) Filed: Apr. 1, 2016

(65) Prior Publication Data

US 2016/0298731 A1    Oct. 13, 2016

(30) Foreign Application Priority Data

Apr. 13, 2015   (JP) ................................ 2015-081734

(51) Int. Cl.
  *F16H 1/32*    (2006.01)
  *F16H 57/029*  (2012.01)
  (Continued)

(52) U.S. Cl.
  CPC ............. *F16H 1/32* (2013.01); *F16H 57/029* (2013.01); *F16H 57/0408* (2013.01);
  (Continued)

(58) Field of Classification Search
  None
  See application file for complete search history.

(56) References Cited

U.S. PATENT DOCUMENTS 4,293,056 A * 10/1981 Setree, II ................ B60B 35/02
                                                    184/105.3
2002/0162407 A1  11/2002 Nightlinger et al.

FOREIGN PATENT DOCUMENTS

JP   S55-46033 U   3/1980
JP   2014-084951 A  5/2014
(Continued)

OTHER PUBLICATIONS

Extended European Search Report as issued in European Patent Application No. 16163671.7, dated Aug. 30, 2016.

*Primary Examiner* — Dirk Wright
(74) *Attorney, Agent, or Firm* — Pillsbury Winthrop Shaw Pittman LLP

(57) ABSTRACT

The present invention provides an oil seal cap that can be attached to a part to be closed without any laborious and time-consuming step and can achieve an efficient oil passage operation such as an oil changing operation. An oil seal cap 30 includes: a body part 31 having a first hole 31a passing therethrough; a port part 32 provided on the body part 31 inside an outer circumferential part of the body part 31 when viewed in the passing-through direction of the first hole 31a, the port part 32 having a second hole 32a passing therethrough and extending in the same direction as the passing-through direction of the first hole 31a; and a plug member 33 configured to block the second hole 32a, the plug member 33 being removably mounted on the port part 32. The second hole 32a is opened, through the first hole 31a, toward a side opposed to a side where the port part 32 is provided on the body part 31; and a surface of the body part 32 is provided with a locking part 38a projecting with respect to the surface.

15 Claims, 9 Drawing Sheets

(51) Int. Cl.
*F16L 55/115* (2006.01)
*F16J 13/12* (2006.01)
*F16H 57/04* (2010.01)
*F01M 11/04* (2006.01)

(52) U.S. Cl.
CPC ............ *F16J 13/12* (2013.01); *F16L 55/115* (2013.01); *F01M 2011/0416* (2013.01)

(56) References Cited

FOREIGN PATENT DOCUMENTS

| | | | | |
|---|---|---|---|---|
| JP | 2014-084999 | 5/2014 | | |
| WO | WO 2014064906 A1 * | 5/2014 | ............... | F16H 1/32 |

* cited by examiner ively carried to be closed without any laborious and time-consuming step and can achieve an efficient oil passage operation such as an oil changing operation, and an eccentric oscillation-type gear device including the oil seal cap.

OIL SEAL CAP AND ECCENTRIC OSCILLATION-TYPE GEAR DEVICE INCLUDING THE SAME

CROSS REFERENCE TO RELATED APPLICATIONS

This application is based upon and claims the benefit of priority from the prior Japanese Patent Application No. 2015-081734 filed on Apr. 13, 2015, the entire contents of which are incorporated herein by reference.

TECHNICAL FIELD

The present invention relates to an oil seal cap and an eccentric oscillation-type gear device including the same.

BACKGROUND ART

An eccentric oscillation-type gear device disclosed in Patent Document 1 includes: a crank shaft having an eccentric part; an oscillation gear having an insertion hole to which the eccentric part of the crank shaft is inserted, and a tooth part; an external cylinder having an internal tooth to be meshed with the tooth part of the oscillation gear; and a carrier disposed inside the external cylinder and hold the oscillation gear through the crank shaft. In the gear device, a closed space for accommodating the oscillation gear is defined by the external cylinder and the carrier. The carrier is provided with a plurality of through-holes which communicate the closed space with the outside. An oil seal cap is fitted in each of the through-holes. These oil seal caps are provided to confine lubricating oil enclosed in the aforementioned closed space.

An oil seal cap (oil sealing member), which has a discoid bottom plate and an annular cylindrical part projecting from an outer circumferential part of the bottom plate, is fitted in a through-hole of the plurality of through-holes, which is formed to opposedly to a radial center of the oscillation gear. In addition, an oil seal cap, which has a body part having an oil hole passing therethrough, and a plug member that closes the oil hole, the plug member being removable from the body part, is fitted in a through-hole of the plurality of through-holes, which is formed for attaching thereto the crank shaft.

According to the latter oil seal cap, during changing of the lubricating oil enclosed in the closed space, the lubricating oil changing operation can be carried out by removing only the plug member without removing the body part. Thus, the lubricating oil changing operation can be efficiently carried out.

PATENT DOCUMENT

Patent Document 1: JP2014-084999A

SUMMARY OF THE INVENTION

The oil seal cap of the above-described oil seal caps, which has the bottom plate and the cylindrical part, prevents leakage of lubricating oil and escape of the oil seal cap from the through-hole, by bringing the cylindrical part into tight contact with an inner circumferential surface of the through-hole. Since the cap incorporates a rigid member made of metal, the cylindrical part is brought into tight contact with the inner circumferential part of the through-hole by means of the rigidity (resiliency), whereby the leakage of lubricating oil and the escape of the oil seal member from the through-hole can be prevented. Since the cap has a simple shape, it is easy to manufacture the cap such that the rigid member made of metal is incorporated therein. In addition, since the cap has a shape that is easily deformable in the radial direction, the cap can be suitably attached to the through-hole by utilizing the rigidity of the rigid member.

On the other hand, as to the oil seal cap of the above-described oil seal caps, which has a body part having an oil hole passing therethrough and a plug member that closes the oil hole, the body part is fitted in the through-hole. Since the body part needs to have a thickness in order that the plug member is removable, the body part has a shape that is resistant to be deformed in the radial direction. Thus, even if the body part is made of a rigid member, this oil seal cap not always can be suitably attached to the through-hole by utilizing the rigidity of the body part.

Thus, as disclosed in Patent Document 1, it is necessary for the latter oil seal cap that its body part is fitted in the through-hole of the carrier through a seal member and an escape stopper so as to prevent the leakage of lubricating oil and the escape of the oil seal cap from the through-hole. In addition, in accordance therewith, the through-hole of the carrier has to be processed for holding the seal member and the escape stopper. However, there is a problem in that such a step is laborious and time-consuming.

The present invention has been made in view of the above circumstances. The object of the present invention is to provide an oil seal cap that can be attached to a part to be closed without any laborious and time-consuming step and can achieve an efficient oil passage operation such as an oil changing operation, and an eccentric oscillation-type gear device including the oil seal cap.

The present invention is an oil seal cap comprising:
a body part having a first hole passing therethrough;
a port part provided on the body part inside an outer circumferential part of the body part when viewed in the passing-through direction of the first hole, the port part having a second hole passing therethrough and extending in the same direction as the passing-through direction of the first hole; and
a plug member configured to block the second hole, the plug member being removably mounted on the port part; wherein:
the second hole is opened, through the first hole, toward a side opposed to a side where the port part is provided on the body part; and
a surface of at least one of the body part and the port part is provided with a locking part projecting or recessed with respect to the surface.

According to the oil seal cap of to the present invention, since the plug member can be removably mounted on the port part, there is no limitation on the shape of the body part for installing the plug member. Thus, it is possible to employ, as the body part, a member which has a simple shape attachable to a part to be closed and which does not require any special processing of the part to be closed. As a result, the oil seal cap can be attached to the part to be closed without any laborious and time-consuming step.

In addition, oil can be passed through the first hole and the second hole by removing only the plug member without removing the body part. Moreover, the movement of the body part can be prevented by locking the locking part of the body part or the port part by means of a tool, the removing operation and the mounting operation of the plug member can be easily carried out.

As a result, according to the oil seal cap of the present invention, the oil seal cap can be attached to the part to be closed without any laborious and time-consuming step, as well as an oil passage operation can be efficiently carried out.

The body part may have a circular shape when viewed in the passing-through direction of the first hole;

an internally threaded part may be formed in an inner circumferential surface of the second hole of the port part; and an externally threaded part may be formed on an outer circumferential surface of the plug member.

To be specific, in such a structure, by locking the locking part of the body part or the port part by means of a tool, when the plug member is rotated with respect to the second hole, the body part can be prevented from being rotated together with the rotation. Therefore, the removing operation and the mounting operation of the plug member can be easily carried out.

In addition, the plug member may be provided with an operation groove capable of locking a tool for rotating the plug member.

According to this structure, the plug member can be rotated by utilizing the operation groove. Thus, the plug member can be easily rotated by means of a tool.

In addition, the body part may include a bottom plate part in which he first hole is formed, and a circumferential wall part projecting from an outer circumferential part of the bottom plate part.

To be more specific, the bottom plate part may have a circular shape when viewed in the passing-through direction of the first hole; and the circumferential wall part may have a cylindrical shape..

In this structure, when the body part is attached to the circular part to be closed, since the body part takes a simple shape that is easily deformable radially, the body part can be easily attached to the circular part to be closed by utilizing a rigid member made of metal, for instance. Therefore, the oil seal cap can be attached to the circular part to be closed without any laborious and time-consuming step.

In addition, the body part further may include a flange part provided on the circumferential wall part to project toward a side opposed to a central side of the bottom plate part.

According to this structure, since the flange part bears against a suitable location of the part to be closed or a peripheral part thereof, the axial movement of the oil seal cap can be restrained. Therefore, the working efficiency of the removing operation and the mounting operation of the plug member can be significantly effectively improved.

In addition, the port part may be provided on a surface of the bottom plate part, from which the circumferential wall part projects.

According to this structure, the size of the oil seal cap can be restrained.

In addition, the port part may be provided on a surface opposed to a surface of the bottom plate part, from which the circumferential wall part projects.

According to this structure, when the plug member is operated by a tool at a distal end of the port part so that an axial force from the tool acts on the body part through the port part, the force deforms the circumferential wall part of the body part radially outside. Thus, when the body part is attached to the circular part to be closed, the circumferential wall part is pushed against the inner circumferential surface of the part to be closed, whereby the movement of the oil seal cap can be restrained. Thus, the working efficiency of the removing operation and the mounting operation of the plug member can be significantly effectively improved.

In addition, the port part may have a polygonal shape when viewed in the passing-through direction of the second hole; and the locking part may be made by a corner portion formed on an outer circumferential surface of the polygonal port part.

According to this structure, the port part can be easily formed, resulting in improvement of production efficiency.

In addition, the port part may have a circular shape when viewed in the passing-through direction of the second hole;

the locking part may be made by a groove formed in an outer circumferential surface of the port part; and the groove may include first groove part extending from one axial end surface of the port part toward the other end surface along the axial direction, and a second groove part extending in a circumferential direction of the port part from an end of the first groove part on a side of the other end surface of the port part.

According to this structure, the tool is moved along the axial direction of the port part, a part of the tool is moved from the first groove part to the second groove part, the tool is rotated when the part of the tool reaches the second groove part, and thereafter, the part of the tool can be set so as to be capable of bearing against the second groove part circumferentially and axially. Thus, the rotation of the oil seal cap and the axial movement thereof can be prevented. Therefore, the working efficiency of the removing operation and the mounting operation of the plug member can be significantly effectively improved.

In addition, a pair of the grooves may be formed oppositely to each other with a center of the port part therebetween.

In addition, the second groove part may have a fan-like (sector) shape or a semicircular shape when viewed in the axial direction of the port part, an arcuate portion of the fan-like (sector) or semicircular shape may be opened from the outer circumferential surface of the port part.

In addition, the present invention is an eccentric oscillation-type gear device (an eccentric rocking-type gear device) for transmitting a driving force by converting a rotational speed between a first member and a second member at a predetermined rotational speed ratio, the gear device comprising:

an eccentric part;

an oscillation gear (a rocking gear) having an insertion hole to which the eccentric part is inserted, and a tooth part;

an external cylinder configured to be attachable to one of the first member and the second member, the external cylinder having an internal tooth to be meshed with the tooth part of the oscillation gear;

a carrier configured to be attachable to the other one of the first member and the second member; and the above-described oil seal cap;

wherein:

a closed space for accommodating the oscillation gear is defined by the carrier and the external cylinder;

a communication hole in communication with the closed space is formed in one of the carrier and the external cylinder; and the oil seal cap blocks the communication hole.

According to the eccentric oscillation-type gear device of the present invention, in the oil seal cap, since the plug member can be removably mounted on the port part, there is no limitation on the shape of the body part for installing the plug member. Thus, it is possible to employ, as the body part, a member which has a simple shape attachable to a part to be closed and which does not require any special processing of the part to be closed. As a result, the oil seal cap can be attached to a through-hole without any laborious and time-consuming step.

In addition, oil can be passed through the first hole and the second hole so as to discharge the oil from the closed space and to supply the oil to the closed space, by removing only the plug member without removing the body part. Moreover, the movement of the body part can be prevented by locking the locking part of the body part or the port part by means of a tool, the removing operation and the mounting operation of the plug member can be easily carried out.

As a result, the oil seal cap can be attached to a through-hole without any laborious and time-consuming step, as well as an oil passage operation can be efficiently carried out.

In addition, the communication hole may have a stepped surface directed outside; and the oil seal cap may be attached to the communication hole in such a manner that the body part bears against the stepped surface.

According to this structure, the movement of the oil seal cap in the axial direction of the communication hole can be restrained. Therefore, the working efficiency of the removing operation and the mounting operation of the plug member can be improved.

In addition, in the oil seal cap, the body part may include a bottom plate part in which the first hole is formed, and a circumferential wall part projecting from an outer circumferential part of the bottom plate part;

the port part may be provided on a surface of the bottom plate part, from which the circumferential wall part projects;

the body part may further include a flange part provided on the circumferential part to project toward a side opposed to a central side of the bottom plate part; and the oil seal cap may be attached to the communication hole in such a manner that the flange part bears against a peripheral part of an outside end of the communication hole, or a chamfer part formed on the outside end of the communication hole.

According to this structure, the movement of the oil seal cap in the axial direction of the communication hole can be restrained. Therefore, the working efficiency of the removing operation and the mounting operation of the plug member can be improved.

According to the present invention, it is possible to provide an oil seal cap that can be attached to a part to be closed without any laborious and time-consuming step and can achieve an efficient oil passage operation, and an eccentric oscillation-type gear device including the oil seal cap.

EMBODIMENTS FOR CARRYING OUT THE INVENTION

Respective embodiments of the present invention will be described herebelow with reference to the drawings.

First Embodiment

An eccentric oscillation-type gear device (referred to as "gear device" herebelow) 1 according to a first embodiment of the present inventio)n is applied as a speed reducer (reduction gear device) to a rotary part of a robot, such as a rotary barrel or an arm joint, a rotary part of various machine tools, and so on.

Figure 1:
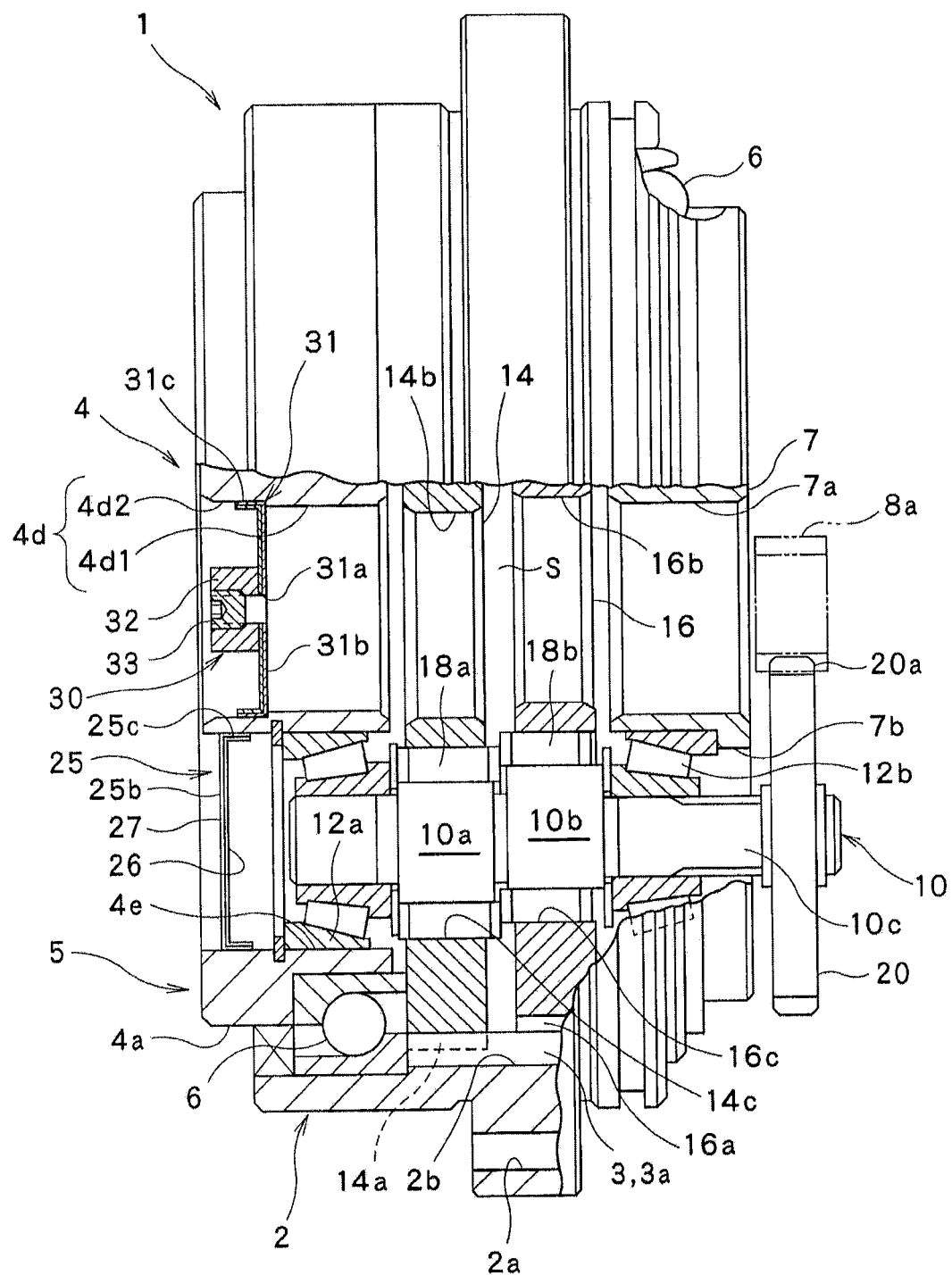
FIG. 1 is a sectional view of an eccentric oscillation-type gear device including an oil seal cap according to a first embodiment of the present invention.

As shown in FIG. 1, the gear device 1 is configured to obtain a reduced output rotation from an input rotation, by rotating an input shaft, not shown, so as to rotate a crank shaft 10, and by oscillatory rotating oscillation gears 14, 16 in conjunction with eccentric parts 10a, 10b of the crank shaft 10. Thus, relative rotation can be generated between, for example, a base (one counterpart member) of a robot and a rotary barrel (the other counterpart member) thereof. For example, the base is a first member by way of illustration, while the rotary barrel is a second member by way of illustration.

The gear device 1 includes an external cylinder 2, a carrier 4, a plurality of (e.g., three) crank shafts 10, a first oscillation gear 14, a second oscillation gear 16, a plurality of (e.g., three) transmission gears 20, and an oil seal cap 30.

The external cylinder 2 defines an outer surface of the gear device 1, and has a substantially cylindrical shape. An inner circumferential surface of the external cylinder 2 is provided with a number of pin grooves 2b. Each pin groove 2 extends in an axial direction of the external cylinder 2, and has a semicircular sectional shape in a section perpendicular to the axial direction. These pin grooves are arranged in the inner circumferential surface of the external cylinder 2 at equal circumferential intervals therebetween.

The external cylinder 2 has a number of internal tooth pins 3. The respective internal tooth pins 3 are attached to the respective pin grooves 2b. Specifically, each internal tooth pin 3 is fitted in the corresponding pin groove 2b, and is arranged to extend in the axial direction of the external cylinder 2. Thus, the number of internal tooth pins 3 are arranged at equals intervals therebetween along the circumferential direction of the external cylinder 2. These internal tooth pins 3 constitute an internal tooth 3a. A first external tooth 14a of the first oscillation gear 14 and a second external tooth 16a of the second oscillation gear 16 are meshed with the internal tooth 3a composed of the internal tooth pins 3.

The external cylinder 2 is provided with a flange part. The flange part has an insertion hole 2a through which a fastening tool (bolt) for securing the external cylinder 2 to, e.g., the base of the robot passes.

The carrier 4 is accommodated in the external cylinder 2 in such a manner that the carrier 4 is arranged coaxially with the external cylinder 2. The carrier 4 is rotated relatively to the external cylinder 2 about the same axis. To be specific, the carrier 4 is disposed radially inside the external cylinder 2, and is supported in this state by the external cylinder 2 through a pair of main bearings 6 that are axially spaced apart from each other, such that the carrier 4 is capable of being rotated relatively to the external cylinder 2.

The carrier 4 includes a base part 5 having a base plate part 4a and a plurality of (e.g., three) shaft parts (not shown), and an end plate part 7.

The base pate part 4a is located in the external cylinder 2 at a position near one axial end thereof. The base plate part 4a has a circular through-hole 4d in a radially central part thereof. The through-hole 4d passes through the base plate part 4a in a thickness direction thereof. A plurality of (e.g., three) crank-shaft attachment holes 4e (referred to simply as "attachment holes 4e" herebelow) are provided around the through-hole 4d at circumferentially equal intervals therebetween. The attachment holes 4e pass through the base plate part 4a in the thickness direction thereof.

The base plate part 4a has a fastening hole for fastening a fastening tool (bolt), not shown, for securing the carrier 4 to, e.g., the rotary barrel of the robot.

The end plate part 7 is located to be axially spaced apart from the base plate part 4a. The end plate 7 is located in the external cylinder 2 at a position near the other axial end thereof. The end plate part 7 has a through-hole 7a in a radially central part thereof. The through-hole 7a passes through the end plate part 7 in a thickness direction thereof. A plurality of (e.g., three) crank-shaft attachment holes 7e (referred to simply as "attachment holes 7e" herebelow) are provided around the through-hole 7a at positions corresponding to the attachment holes 4e of the base plate part 4a. The attachment holes 7b pass through the end plate part 7 in the thickness direction thereof. Inside the external cylinder 2, there is defined a closed space S surrounded by inner surfaces of the end plate part 7 and the base plate part 4a, which are opposed to each other, and the inner circumferential surface of the external cylinder 2. Namely, the closed space S is defined by the external cylinder 2 and the carrier 4.

The through-holes 4d, 7a and the attachment holes 4e, 7e serve as communication holes that communicate the outside and the closed space S with each other.

An oil seal member 25 is attached in each of the attachment holes 4e. The oil seal member 25 includes a discoid bottom plate part 25b, and an annular cylindrical part 25c projecting from an outer circumferential part of the bottom plate part 25b. The oil seal member 25 has a cylindrical shape with a bottom. The cylindrical part 25c is in tight contact with an inner circumferential surface of the attachment hole 4e. Thus, lubricating oil enclosed in the carrier 4 is prevented from leakage.

The oil seal member 25 includes an inner-surface forming part 26 constituting an inner surface, and an outer-surface forming part 27 constituting an outer surface. The inner-surface forming part 26 is a rigid member made of metal, and has a cylindrical shape with a bottom. The outer-surface forming part 27 is made of resin, and covers an outer surface of the inner-surface forming part 26. Due to the rigidity (resiliency) of the inner-surface forming part 26, the cylindrical part 25c of the oil seal member 25 is pushed against the inner circumferential surface of the attachment hole 4e. The bottom part of the inner-surface forming part 26 and the bottom part of the outer-surface forming part 27 form the bottom plate part 25b, and the cylindrical part of the inner-surface forming part 26 and the cylindrical part of the outer-surface forming part 27 form the cylindrical part 25c.

The three shaft parts are integrally provided on the base plate part 4a, and linearly extend from one main surface (inside surface) of the base plate part 4a toward the end plate part 7. The three shaft parts are arranged at circumferentially equal intervals therebetween. Each shaft part is fastened to the end plate part 7 by a bolt, not shown. Thus, the base plate part 4a, the shaft parts and the end plate part 7 are integrated with one another.

The three crank shafts 10 are arranged at equal intervals therebetween around a center axis of the carrier 4 in the external cylinder 2, for example. Each crank shaft 10 is supported by a pair of crank bearings 12a, 12b so as to be axially rotatable with respect to the carrier 4. Specifically, the first crank bearing 12a is attached to one axial end of each crank shaft 10, and the first crank bearing 12a is attached to the attachment hole 4e of the base plate 4a. On the other hand, the second brank bearing 12b is attached to the other axial end of each crank shaft 10, and the second crank bearing 12b is attached to the attachment hole 7b of the end plate part 7. Thus, the crank shaft 10 is rotatably supported by the base plate part 4a and the end plate 7.

Each crank shaft 10 includes a shaft body 10c, and the aforementioned eccentric parts 10a, 10b formed integrally with the shaft body 10c. The first eccentric part 10a and the second eccentric part 10b are axially arranged side by side between parts supported by the crank bearings 12a, 12b. The first eccentric part 10a and the second eccentric part 10b respectively have a columnar shape, and protrude radially outside from the shaft body 10c eccentrically with respect to an axial center of the shaft body 10c. The first eccentric part 10a and the second eccentric part 10b are respectively eccentric from the axial center at predetermined eccentricities, so as to have a phase difference therebetween at a predetermined angle.

The first oscillation gear 14 is disposed in the closed space S inside the external cylinder 2, and is attached to the first eccentric part 10a of each crank shaft 10 through a first roller bearing 18a. When each crank shaft 10 is rotated so that the first eccentric part 10a is eccentrically rotated, the first oscillation gear 14 is oscillatory rotated in conjunction with the eccentric rotation while being meshed with the internal tooth pins 3.

The first oscillation gear 14 has a size slightly smaller than the internal diameter of the external cylinder 2. The first oscillation gear 14 includes the aforementioned first external tooth 14a, a central through-hole 14b, a plurality of (e.g., three) first-eccentric-part insertion holes 14c, and a plurality of, (e.g., three) shaft-part insertion holes (not shown). The first external tooth 14a has a corrugated shape that smoothly continues over the whole the oscillation gear 14 in the circumferential direction.

The central through-hole 14c is provided in the radially central part of the first oscillation gear 14. The three first-eccentric-part insertion holes 14c are provided around the central through-hole 14b in the first oscillation gear 14 at circumferentially equal intervals therebetween. The first eccentric part 10a of each crank shaft 10 is inserted through each first-eccentric-part insertion hole 14c with the first roller bearing 18a interposed therebetween.

The plurality of shaft-part insertion holes are provided around the central through hole 14b in the first oscillation gear 14 at circumferentially equal intervals therebetween. Each shaft-part insertion hole is arranged at a position between the firsteccentric-part insertion holes 14c in the circumferential direction, for example. The shaft part is inserted through each corresponding shaft-part insertion hole with a play between the shaft part and the corresponding shaft part insertion hole.

The second oscillation gear 16 is disposed in the closed space S inside the external cylinder 2, and is attached to the second eccentric part 10b of each crank shaft 10 through a second roller bearing 18b. The first oscillation gear 14 and the second oscillation gear 16 are axially arranged side by side correspondingly to the locations of the first eccentric part 10a and the second eccentric part 10b. When each crank shaft 10 is rotated so that the second eccentric part 10b is eccentrically rotated, the second oscillation gear 16 is oscillatory rotated in conjunction with the eccentric rotation while being meshed with the internal tooth pins 3.

The second oscillation gear 16 has a size slightly smaller than the internal diameter of the external cylinder 2, and has the same structure as that of the first oscillation gear 14. Namely, the second oscillation gear 16 includes the aforementioned second external tooth 16a, a central through-hole 16b, a plurality of (e.g., three) second-eccentric-part insertion holes 16c, and a plurality of, (e.g., three) shaft-part insertion holes (not shown). The second external tooth 16a, the central through-hole 16b, the second-eccentric-part insertion holes 16c and the shaft-part insertion holes are the same in structure as the first external tooth 14a, the central through-hole 14b, the first-eccentric-part insertion holes 14c and the shaft-part insertion holes of the first oscillation gear 14. The second eccentric part 10b of the crank shaft 10 is inserted through each second-eccentric-part insertion hole 16c with the second roller bearing 18b interposed therebetween.

Each of the transmission gears 20 is attached to a region axially outside a part where each crank shaft 10 is attached to the inside of the attachment hole 7b of the end plate part 7. Each transmission gear 20 includes an external tooth 20a to be meshed with an input gear 8a. The input gear 8a receives a rotational driving force from an input shaft functioning as an input unit to which a driving force of a drive motor, not shown, is inputted. Each transmission gear 20 transmits the rotation of the input gear 8a to the corresponding crank shaft 10.

Each transmission gear 20 is externally fitted on an end of the shaft body 10c of the corresponding crank shaft 10. Each transmission gear 20 is integrally rotated with the crank shaft 10 about the same axis as the rotating axis of the crank shaft 10. When each transmission gear 20 is driven by the input gear 8a, each crank shaft 10 is rotated about the axis. When each crank shaft 10 is rotated, the oscillation gears 14, 16 attached to the eccentric parts 10a, 10b are oscillated in conjunction with the rotations of the eccentric parts 10a, 10b while being meshed with the internal tooth pins 3, whereby the carrier 4 and the external cylinder 2 are rotated relatively to each other.

The oil seal cap 30 is attached to the through-hole 4d formed in the radially central part of the base plate part 4a of the carrier 4 so as to block the through-hole 4d. As shown in FIGS. 1 and 2, the oil seal cap 30 includes a body part 31, a port part 32 provided on the body part 31 inside an outer circumferential part of the body part 31, and a plug member 33 removably mounted on the port part 32.

The body part 31 has a first hole 31a passing therethrough. When viewed in the passing-through direction of the first hole 31a, the body part 31 has a circular shape. The first hole 31a is a hole having a circular cross-section. In this embodiment, the first hole 31a is formed in the radially central part of the body part 31.

The body part 31 includes a discoid bottom plate part 31b in which the first hole 31a is formed, and a cylindrical circumferential wall part 31c projecting from the outer circumferential part of the bottom plate part 31b. The body part 31 has a cylindrical shape with a bottom. The circumferential wall part 31c is in tight contact with the inner circumferential surface of the through-hole 4d. Thus, the lubricating oil closed in the carrier 4 is prevented from leakage.

Figure 2A:
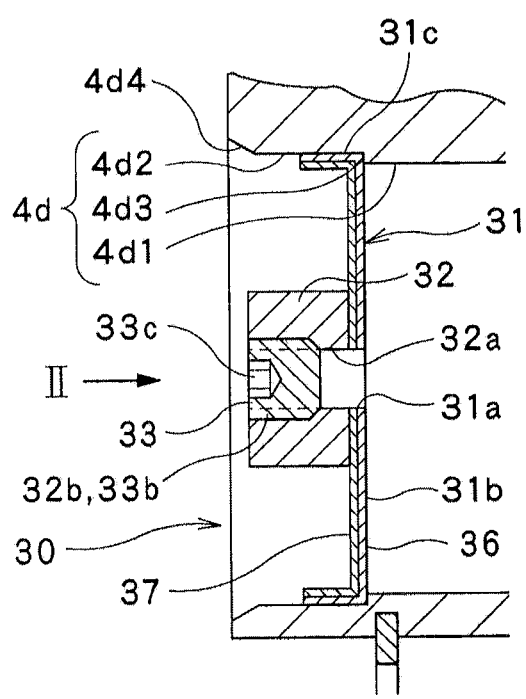
FIG. 2A is an enlarged view of the oil seal cap shown in FIG. 1.

As shown in FIG. 2A, the body part 31 includes an inner-surface forming part 37 constituting an inner surface, and an outer-surface forming part 36 constituting an outer surface. The inner-surface forming part 37 is a rigid member made of metal, and has a cylindrical shape with a bottom. The outer-surface forming part 36 is made of resin, and covers an outer surface of the inner-surface forming part 37. Due to the rigidity (resiliency) of the inner-surface forming part 37, the circumferential wall part 31c of the body part 31 is pushed against the inner circumferential surface of the through-hole 4d. The bottom part of the inner-surface forming part 37 and the bottom part of the outer-surface forming part 36 form the bottom plate part 31b, and the cylindrical part of the inner-surface forming part 37 and the cylindrical part of the outer-surface forming part 36 form the circumferential wall part 31c. In this embodiment, the outer-surface forming part 36 made of resin is directed toward the closed space S in the through-hole 4d. However, in place thereof, when the outer-surface forming part 36 made of resin is directed outside from the through-hole 4d, excellent weather resistance can be ensured.

As shown in FIG. 2A, in this embodiment, the through-hole 4d includes a first hole part 4d1, a second hole part 4d2 having a diameter larger than that of the first hole part 4d1, and a stepped surface 4d3 formed between the first hole part 4d1 and the second hole part 4d2. The first hole part 4d1 is formed on the side of the closed space S. The second hole part 4d2 is formed adjacently to the first hole part 4d1 at a position outside the closed space S as compared with the first hole part 4d1. The stepped surface 4d3 is directed outside.

The second hole part 4d2 has a chamfer part 4d4 at an outside end thereof. The oil seal cap 30 is fitted in the through-hole 4d in such a manner that an outer circumferential part of the bottom plate part 31b of the body part 31 bears against the stepped surface 4d3. Thus, the oil seal cap 30 is prevented from being moved toward the closed space S along the axial direction of the through-hole 4d. In addition, the circumferential wall part 31c is in tight contact with an inner circumferential surface of the second hole part 4d2 of the through-hole 4d.

The port part 32 is disposed on a surface of the bottom plate part 31b, from which the circumferential wall part 31c projects, i.e., on a bottom plate part of the inner-surface forming part 37 made of metal, so that the port part 32 faces outside and is exposed outside. When viewed in the passing-through direction of the first hole 31a of the body part 31, the port part 32 is provided on the body part 31 inside the outer circumferential part of the body part 31. The port part 32 is secured on the inner-surface forming part 37 by welding, for example. The port part 32 has a second hole 32a extending in the same direction as the passing-through direction of the first hole 31a. The second hole 32a is opened, through the first hole 31a, to a side (side of the closed space S) opposed to the side (outside) where the port part 32 is provided on the body part 31.

An internally threaded part 32b is formed in an inner circumferential surface of the second hole 32a. In the illustrated example, the internally threaded part 32b extends from an outside end of the second hole 32a up to a position slightly over an intermediate point, which is between the outside end of the second hole 32a and another end thereof on the side of the closed space S, toward the closed space S. On the other hand, an externally threaded part 33b to be threadedly engaged with the internally threaded part 32b is formed on an outer circumferential surface of the plug member 33. By threadedly engaging the externally threaded part 33b on the outer circumferential surface of the plug member 33 with the internally threaded part 32b in the inner circumferential surface of the second hole 32a, the plug member 33 blocks the second hole 32a. In this example, the internally threaded part 32b is not formed over all the axial area of the inner circumferential surface the second hole 32a. Thus, when the plug member 33 is screwed into the internally threaded part 32b in the inner circumferential surface of the second hole 32a, a distal end of the externally threaded part 33b of the plug member 33 finally bears axially against a boundary part between the internally threaded part 32b in the inner circumferential surface of the second hole 32a and a non-threaded part. Under this condition, the second hole 32a can be hermetically sealed by the plug member 33. The externally threaded part 33b of the plug member 33 and the internally threaded part 32b of the second hole 32a may be either straight screws threads or tapered threads.

Figure 2B:
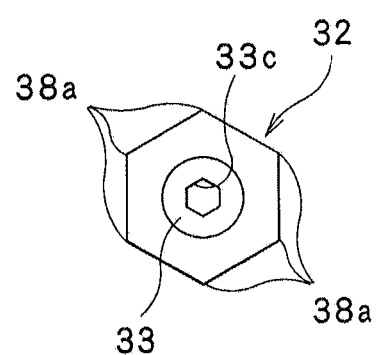
FIG. 2B is a view of the oil seal cap, when viewed in the direction of an arrow II in FIG. 2A.

A surface of the port part 32 is provided with a locking part 38a which projects with respect to the surface. The locking part 38a is formed so as to be circumferentially locked by a tool. As shown in FIG. 2B in detail, the port part 32 in this embodiment has a polygonal shape, specifically, a hexagonal shape, when viewed in the passing-through direction of the second hole 32a. The locking part 38a is made by a corner portion formed on an outer circumferential surface of the hexagonal port part 32. Namely, in this embodiment, six locking parts 38a are provided on the port part 32.

In addition, the plug member 33 has an operation groove 33c that is capable of locking a tool for rotating the plug member 33. The operation groove 33c is a groove formed in one main surface (outside main surface) of the plug member 33, and has a polygonal (hexagonal in the illustrated example) cross-section. By inserting a distal end of a tool into the operation groove 33c and rotating the tool, the plug member 33 can be easily rotated with respect to the port part 32. Thus, the plug member 33 can be removed from the port part 32, and can be mounted on the port part 32. With the plug member 33 being removed from the body part 31, the outside and the closed space S communicate with each other through the second hole 32a and the first hole 31a, even when the body part 31 is attached to the carrier 4. Thus, lubricating oil can be supplied to the closed space S through the second hole 3a and the first hole 31a. In addition, the lubricating oil enclosed in the closed space S can be discharged through the second hole 32a and the first hole 31a.

Next, an example of a method of operating the oil seal cap 30 according to this embodiment is described with reference to FIG. 3.

Figure 3A:
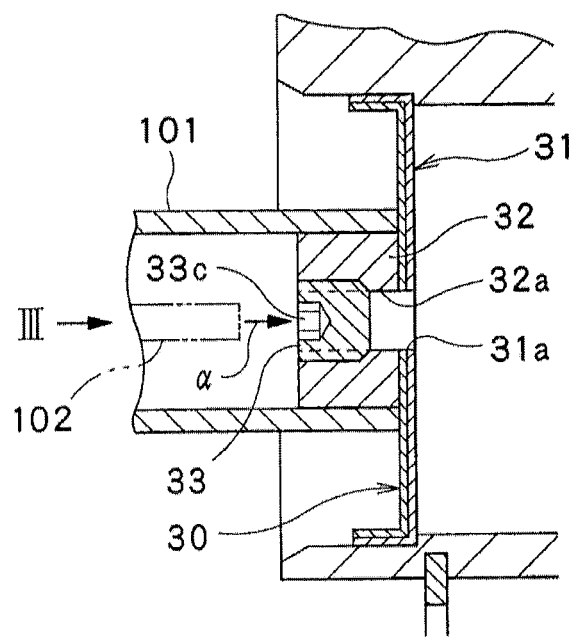
FIG. 3A is a sectional view for explaining an example of a method of operating the oil seal cap.
Figure 3B:
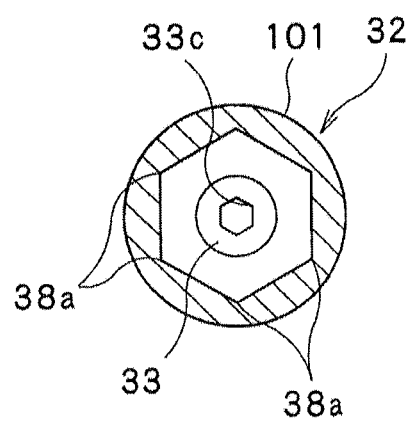
FIG. 3B is a view of the oil seal cap, when viewed in the direction of an arrow III in FIG. 3A.

In this example, there are firstly prepared a first cylindrical tool 101 having an hexagonal inner circumferential surface and a second rod-like tool 102 having a hexagonal outer circumferential surface. Both ends of the first tool 101 are opened. As shown in FIGS. 3A and 3B, the first tool 101 is operated such that the port part 32 is inserted thereinto from one end thereof. Under this condition, the respective locking parts 38a of the port part 32 are locked by the hexagonal inner circumferential surface of the first tool 100. In FIG. 3A, the second tool 102 is illustrated by the two-dot chain lines for the convenience of explanation.

Then, as shown by an arrow a in FIG. 3A, the second tool 102 is introduced to the first tool 101 from the other end thereof, so that a distal end of the second tool 102 is inserted to the operation groove 33c of the plug member 33. Thereafter, by rotating the second tool 102, the plug member 33 can be rotated with respect to the port part 32. Thus, the plug member 33 can be removed from the port part 32, and can be mounted on the port part 32.

At this time, since the locking parts 38a of the port part 32 are locked by the first tool 101 so that the tool 101 is unrotatably held, the relative rotation of the whole oil seal cap 30 with respect to the through-hole 4d is restricted. Thus, when the plug member 33 is rotated with respect to the second hole 32a, the body part 31 can be prevented from being rotated together with the rotation. Therefore, according to the oil seal cap 30 in this embodiment, the removing operation and the mounting operation of the plug member 33 can be easily carried out.

With the plug member 33 being removed from the port part 32, the outside and the closed space S communicate with each other through the second hole 32a and the first hole 31a, even when the body part 31 is attached to the carrier 4. Thus, lubricating oil can be supplied to the closed space S through the second hole 32a and the first hole 31a. In addition, the lubricating oil enclosed in the closed space S can be discharged through the second hole 32a and the first hole 31a.

According to the above-described embodiment, since the plug member 33 can be removably mounted on the port part 32 in the oil seal cap 30, there is no limitation on the shape of the body part 31 for installing the plug member 33. Thus, it is possible to employ, as the body part 31, a member which has a simple shape attachable to the through-hole 4d and which does not require any special processing of the through-hole 4d. As a result, the oil seal cap 30 can be attached to the through-hole 4d without any laborious and time-consuming step.

To be specific, in this embodiment, a member, which includes the discoid bottom plate 31*b* and the cylindrical circumferential wall part 31*c* projecting from the outer circumferential part of the bottom plate part 31*b*, is employed as the body part 31. Since such a simple member having a shape that is easily deformable radially is employed as the body part 31 as well as the metal rigid member (inner-surface forming part 37) is utilized, the body part 31 can be easily attached to the through-hole 4*d*. As a result, the oil seal cap 30 can be attached to the through-hole 4*d* without any laborious and time-consuming step.

In addition, lubricating oil can be passed through the first hole 31*a* and the second hole 32*b* by removing only the plug member 33 without removing the body part 31. Moreover, the movement of the body part 31 can be prevented by locking the locking parts 38*a* of the port part 32 by means of a tool, the removing operation and the mounting operation of the plug member 33 can be easily carried out. Specifically, in this embodiment, the body part 31 has a circular shape when viewed in the passing-through direction of the first hole 31*a*, the internally threaded part 32*b* is formed in the inner circumferential surface of the second hole 32*a*, and the externally threaded part 33*b* is formed on the outer circumferential surface of the plug member 33. By locking the locking parts 38*a* of the port part 32 by means of a tool, when the plug member 33 is rotated with respect to the second hole 32*a*, the body part 31 can be prevented from being rotated together with the rotation. Therefore, the removing operation and the mounting operation of the plug member 33 can be easily carried out.

According to the present invention, the oil seal cap 30 can be attached to the through-hole 4*d* without any laborious and time-consuming step, as well as an oil passage operation such as a lubricating oil passage operation can be efficiently carried out.

In addition, since the plug member 33 has the operation groove 33*c* capable of locking a tool for rotating the plug member 33, the plug member 33 can be rotated by utilizing the operation groove 33*c*. Thus, the plug member 33 can be easily rotated by the tool.

In addition, since the port pat 32 is provided on the surface of the bottom plate part 31*b*, from which the circumferential wall part 31*c* projects, the port part 32 and the circumferential wall part 31*c* overlap with each other in the radial direction (direction along the main surface of the bottom plate part 31*b*). Thus, the size of the oil seal cap 30 can be restrained.

In addition, the port part 32 has a hexagonal shape when viewed in the passing-through direction of the second hole 32*a*, and the locking parts 38*a* are made by the corner portions formed on the outer circumferential surface of the hexagonal port part 32. Due to this structure, the port part 32 can be easily formed, resulting in improvement of production efficiency.

Second Embodiment

Next, a second embodiment of the present invention is described with reference to FIGS. 4 to 8. The same constituent elements in this embodiment as the constituent elements in the first embodiment are shown by the the same symbols, and explanation thereof is omitted. Herebelow, structures different from the first embodiment are mainly described.

Figure 4A:
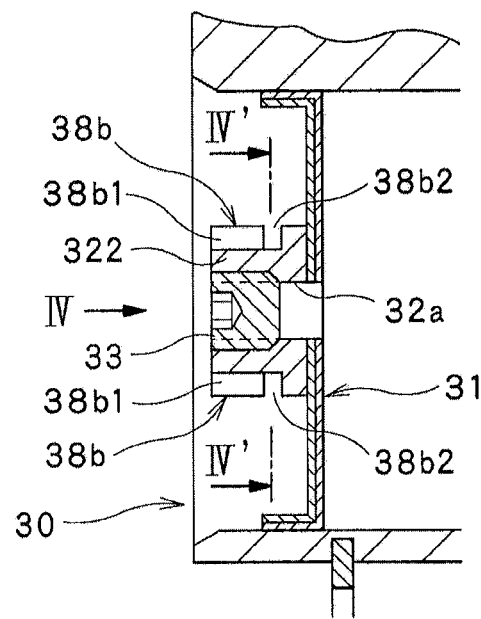
FIG. 4A is a sectional view of an important part of the eccentric oscillation-type gear device including an oil seal cap according to a second embodiment of the present invention.
Figures 4B, 4C:
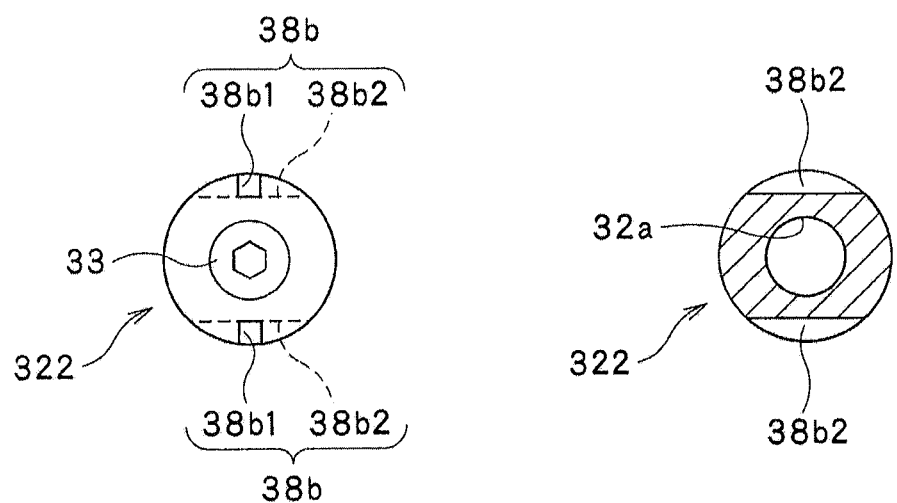
FIG. 4B is a view of the oil seal cap, when viewed in the direction of an arrow IV in FIG. 4A.
FIG. 4C is a sectional view taken along a line IV'-IV' in FIG. 4A.
Figure 5:
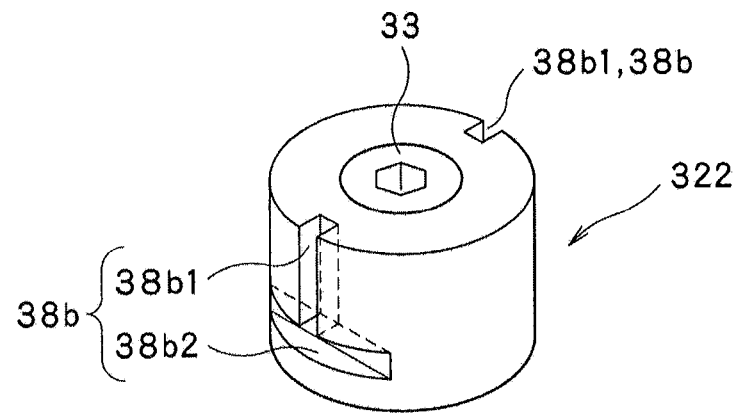
FIG. 5 is a perspective view of a port part of the oil seal cap according to the second embodiment.

In this embodiment, a port 322 is different from that of the first embodiment. As shown in FIGS. 4 and 5, the port part 322 of the oil seal cap 30 in this embodiment has a circular shape when viewed in the passing-through direction of the second hole 32*a*. A locking part 38*b* is made by a groove formed in an outer circumferential surface of the port part 322.

The locking part 38*b* formed of a groove includes a first groove part 38*b*1 extending from one axial end surface (outside surface) of the port part 322 toward the other end surface (surface on the side of the closed space S) along the axial direction, and a second groove 38*b*2 extending in a circumferential direction of port part 322 from an end of the first groove 38*b* on a side of the other end surface of the port part 322. As shown in FIG. 4C, the second groove part 38*b*2 has a semicircular shape when viewed in the axial direction of the port part 322, and an arcuate portion thereof is opened from an outer circumferential surface of the port part 322.

Namely, the second groove part 38*b*2 extends from the first groove part 38*b*1 on both circumferential sides of the port part 322. A pair of the locking part 38*b* formed of such groove parts are formed opposedly to each other, with a center of the port part 322 therebetween.

The through-hole 4*d* does not have the stepped surface 4*d*3 described in the first embodiment. Thus, the oil seal cap 30 is not prevented from being moved along the axial direction of the through-hole 4*d*, toward the closed space S and toward the outside.

An example of a method of operating the oil seal cap 30 according to this embodiment is described with reference to FIGS. 6 to 8.

Figure 6:
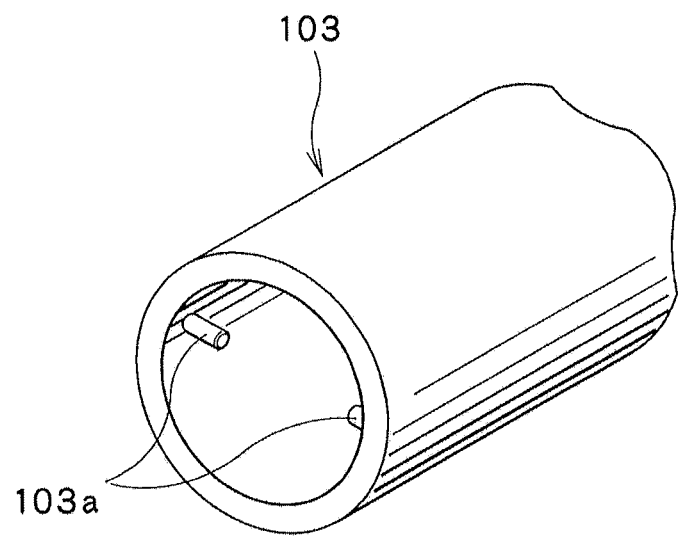
FIG. 6 is a perspective view of a tool for operating the oil seal cap according to the second embodiment.

In this example, there are prepared a third tool 103 shown in FIG. 6, and the second tool 102 described in the first embodiment. The third tool 103 has a cylindrical shape with both ends being opened. A pair of pin parts 103*a* opposed to each other are provided in an inner surface of the third tool 103 on one end side thereof. In the third tool 103, the pair of pin parts 103*a* are located at positions opposed to each other with a center of the third tool 103 therebetween. The pin part 103 is formed to have a size that can be inserted to the first groove part 38*b*1 and inserted to the second groove part 38*b*2.

Figures 7A, 7B, 7C:
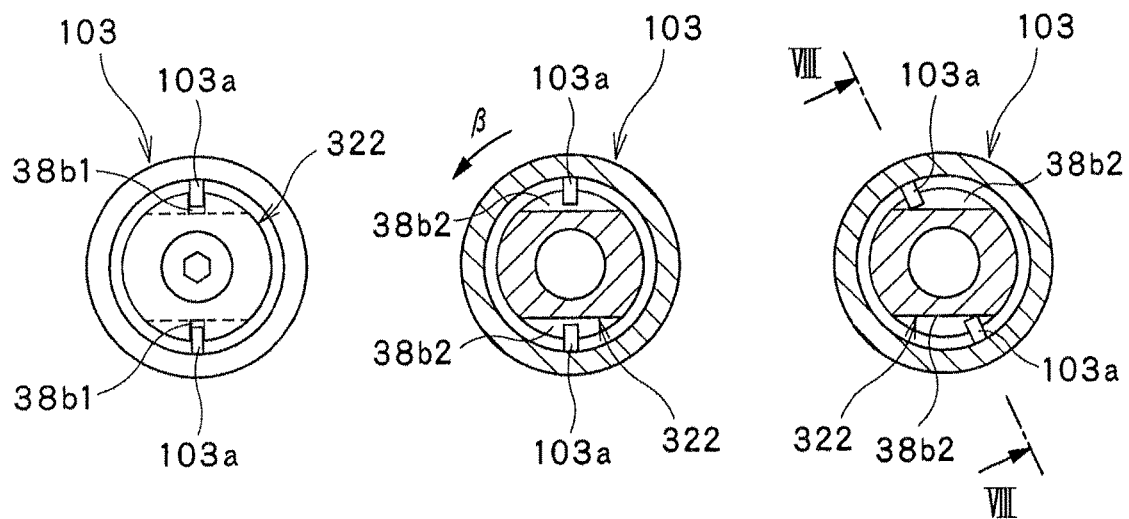
FIGS. 7A to 7C are views for explaining an example of a method of operating the oil seal cap according to the second embodiment.

As shown in FIG. 7A, the third tool 103 is operated such that the port part 322 is inserted thereto from one end thereof, by inserting the respective pin parts 38*b*1 to the first groove parts 38*b*1. Then, as shown in FIG. 7B, the third tool 103 is operated until the pin parts 103*a* reach the second groove parts 38*b*.

Then, as shown in an arrow f3 of FIG. 7B, the third tool 103 is rotated about its axis. As shown in FIG. 7C, the third tool 103 is operated such that the pin part 103*a* is moved up to a circumferential position in contact with or close to a wall surface of the second groove part 38*b*2, which extends in the axial direction of the port part 322. Under this condition, as shown in FIG. 8, the pin part 103*a* is capable of bearing against the wall surface of the second groove part 38*b*2 circumferentially and axially. In a case where the length of the pin part 103*a* is identical to the radial length of the first groove 38*b*1 when viewed in the axial direction of the tool 103 or the port part 322, the tool 103 cannot be rotated. Thus, as shown in FIGS. 7A and 7B, the pin part 103 is formed smaller than the radial length of the first groove part 38*b*1.

Figure 8:
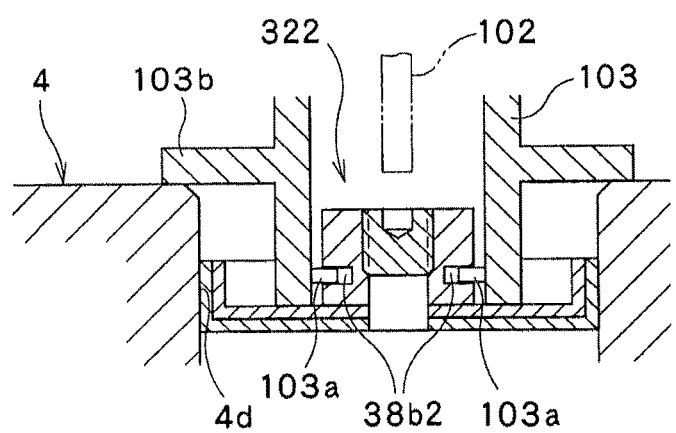
FIG. 8 is a sectional view taken along a line VIII-VIII in FIG. 7C.

Then, as shown in FIG. 8, the second tool 102 is introduced to the third tool 103 from the other end thereof, so that the distal end of the second tool 102 is inserted to the operation groove 33*c* of the plug member 33. Then, by rotating the second tool 102, the plug member 33 can be rotated with respect to the port part 32. Thus, the plug member 33 can be removed from the port part 32, and can be mounted on the port part 32

At this time, since the second groove parts 38b2 of the locking parts 38b of the port part 322 are circumferentially and axially locked by the pin parts 103a of the third tool 103 so that the tool 103 is held unrotatably and immovably in the axial direction, the relative rotation of the whole oil seal cap 30 and the axially relative movement thereof to the through-hole 4d are restricted. Thus, when the plug member 33 is rotated with respect to the second hole 32a, the body part 31 can be prevented from being rotated together with the rotation, and the body part 31 can be prevented from being moved in the axial direction of the through-hole 4d. Therefore, according to the oil seal cap 30 in this embodiment, the removing operation and the mounting operation of the plug member 33 can be easily carried out.

In addition, the tool 103 may be provided with a locking part 103b that bears against an edge part (peripheral part) of the through-hole 4d. As shown in FIG. 8, owing to the provision of the locking part 103b, an insertion position of the oil seal cap 30 inside the tool 103 can be restricted.

When the plug member 33 is rotated with respect to the second hole 32a, a force for pushing the oil seal cap 30 into the through-hole 4d may be generated from the second tool 102. In this embodiment, since the oil seal cap 30 can be prevented from being moved by such a force, the removal operation and the mounting operation of the plug member 33 can be easily carried out. In particular, in this embodiment, since the oil seal cap 30 is not prevented from being moved along the axial direction of the through-hole 4d toward the closed space S and toward the outside, the oil seal cap 30 in this embodiment can be beneficially used.

Preferably, the direction in which the third tool 103 is rotated when the pin part 103a reaches the second groove part 38b is opposed to the direction in which the plug member 33 is rotated by the second tool 102. This is because, in this case, since the body part 31, which would be rotated together with the rotation of the plug member 33, is immediately locked by the pin part 103a through the second groove part 38b2 of the port part 322, the rotation of the body part 31 can be reliably prevented.

According to the above-described embodiment, the third tool 103 is moved along the axial direction of the port part 322, the pin part 103a, which is a part of the third tool 103, is moved from the first groove part 38b1 to the second groove part 38b2, the tool 103 is rotated when the pin part 103a reaches the second groove part b2, and thereafter, the pin part 103a of the tool 103 can be set so as to be capable of bearing against the second groove part 38b2 circumferentially and axially. Thus, the rotation of the oil seal cap 30 and the axial movement thereof can be prevented. Therefore, the working efficiency of the removing operation and the mounting operation of the plug member 33 can be significantly effectively improved.

Third Embodiment

Next, a third embodiment of the present invention is described with reference to FIG. 9. The same constituent elements in this embodiment as the constituent elements in the first and second embodiments are shown by the the same symbols, and explanation thereof is omitted. Herebelow, structures different from the first and second embodiments are mainly described.

Figure 9:
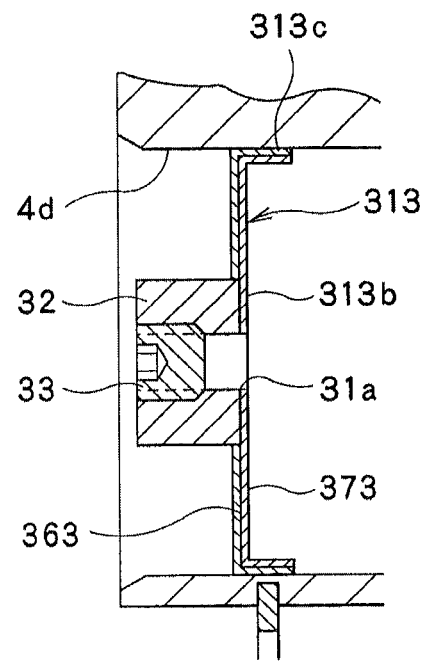
FIG. 9 is a sectional view of an important part of the eccentric oscillation-type gear device including an oil seal cap according to a third embodiment of the present invention.

As shown in FIG. 9, in this embodiment, a body part 313 of the oil seal cap 30 is different from that of the first and second embodiments. As shown in FIG. 9, the body part 313 according to this embodiment includes a discoid bottom plate part 313b in which the first hole 31a is formed, and a cylindrical circumferential wall part 313c projecting from an outer circumferential part of the bottom plate part 313b. The body part 313 has a cylindrical shape with a bottom. The circumferential wall part 313c is in tight contact with the inner circumferential surface of the through-hole 4d.

The body part 313 includes an inner-surface forming part 373 constituting an inner surface, and an outer-surface forming part 363 constituting an outer surface. The inner-surface forming part 373 is a rigid member made of metal, and has a cylindrical shape with a bottom. The outer-surface forming part 363 is made of resin, and covers an outer surface of the inner-surface forming part 373. The port part 32, which is the same as that of the first embodiment, is provided on a surface opposed to the surface of the bottom plate part 313b of the body part 313, from which the circumferential wall part 313c projects, so that the port part 32 faces outside and is exposed outside. In more detail, in this example, the first hole 31a is formed in the inner-surface forming part 373, and the port part 32 projects from a peripheral part of the first hole 31a of the inner-surface forming part 373. The outer-surface forming part 363 covers the outer surface of the inner-surface forming part 373 radially outside the port part 32.

According to this embodiment, when the plug member 33 is operated by a tool at a distal end of the port part 32 so that an axial force from the tool acts on the body part 313 through the port part 32, the force deforms the circumferential wall part 313c of the body part 313 radially outside. Thus, when the body part 313 is attached to the circular through-hole 4d, the circumferential wall part 313c is pushed against the inner circumferential surface of the through-hole 4d, whereby the axial movement of the oil seal cap 30 can be restrained. Thus, the working efficiency of the removing operation and the mounting operation of the plug member 33 can be significantly effectively improved.

Fourth Embodiment

Next, a fourth embodiment of the present invention is described with reference to FIG. 10. The same constituent elements in this embodiment as the constituent elements in the first to third embodiments are shown by the the same symbols, and explanation thereof is omitted. Herebelow, structures different from the first to third embodiments are mainly described.

Figure 10:
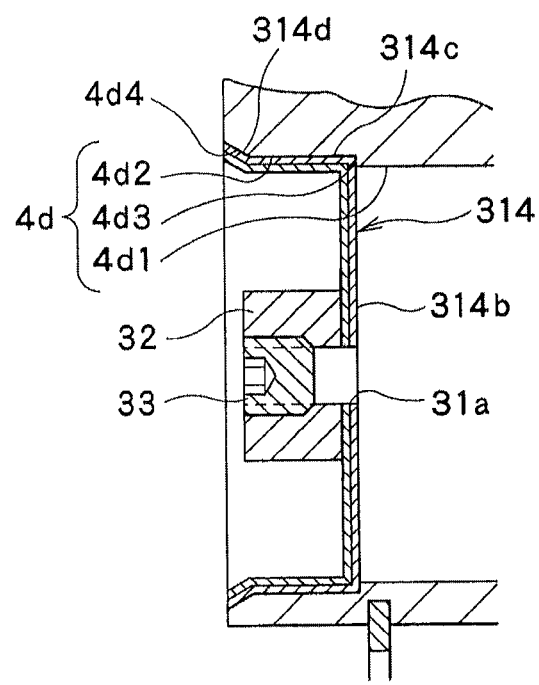
FIG. 10 is a sectional view of an important part of the eccentric oscillation-type gear device including an oil seal cap according to a fourth embodiment of the present invention.

As shown in FIG. 10, in this embodiment, a body part 314 of the oil seal cap 30 is different from those of the first to third embodiments. As shown in FIG. 10, the body part 314 according to this embodiment has a discoid bottom plate 314b in which the first hole 31a is formed, a cylindrical circumferential wall part 314c projecting from an outer circumferential part of the bottom plate part 314b, and a flange part 314d provided on the circumferential wall part 314c to project toward a side opposed to a central side of the bottom plate part 314b.

The circumferential wall part 314c is in tight contact with an inner circumferential surface of the second hole 4d2 of the through-hole 4d. In addition, the oil seal cap 30 is attached to the through-hole 4d in such a manner that the flange part 314d bears against the chamfer part 4d4.

According to this embodiment, since the flange part 314d bears against the chamfer part 4d4, the movement of the oil seal cap 30 in the axial direction (depth direction) of the through-hole 4d can be restrained. Thus, the working efficiency of the removing operation and the mounting operation of the plug member 33 can be significantly effectively improved.

Fifth Embodiment

Next, a fifth embodiment of the present invention is described with reference to FIG. 11. The same constituent elements in this embodiment as the constituent elements in the first to fourth embodiments are shown by the the same symbols, and explanation thereof is omitted. Herebelow, structures different from the first to fourth embodiments are mainly described.

Figure 11:
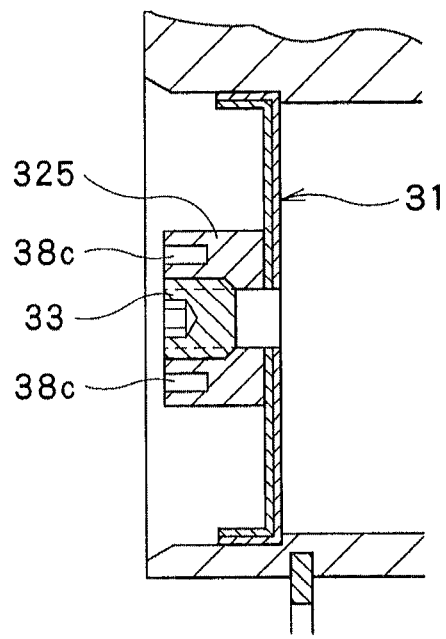
FIG. 11 is a sectional view of an important part of the eccentric oscillation-type gear device including an oil seal cap according to a fifth embodiment of the present invention.

As shown in FIG. 11, in this embodiment, a port part 325 of the oil seal cap 30 is different from those of the first to fourth embodiments. As shown in FIG. 11, the port part 325 has, in one end surface directed outside in the thickness direction thereof, a locking part 388c which is recessed with respect to the one end surface.

Also in this embodiment, the oil seal cap 30 can be attached to the through-hole 4d without any laborious and time-consuming step, as well as an oil passage operation such as a lubricating oil passage operation can be efficiently carried out.

Sixth Embodiment

Next, a sixth embodiment of the present invention is described with reference to FIG. 12. The same constituent elements in this embodiment as the constituent elements in the first to fifth embodiments are shown by the the same symbols, and explanation thereof is omitted. Herebelow, structures different from the first to fifth embodiments are mainly described.

Figure 12:
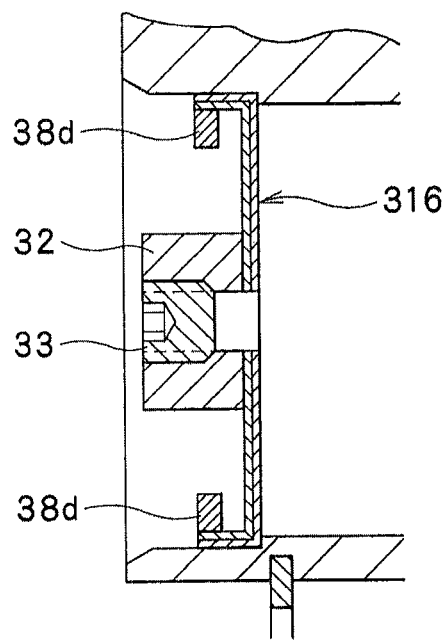
FIG. 12 is a sectional view of an important part of the eccentric oscillation-type gear device including an oil seal cap according to a sixth embodiment of the present invention.

As shown in FIG. 12, in this embodiment, a body part 316 of the oil seal cap 30 is different from those of the first to fifth embodiments. As shown in FIG. 12, the body part 316 according to this embodiment has a locking part 38d projecting from an inner surface of a circumferential wall part thereof. Meanwhile, no locking part is formed on the port part 32.

Also in this embodiment, the oil seal cap 30 can be attached to the through-hole 4d without any laborious and time-consuming step, as well as an oil passage operation such as a lubricating oil passage operation can be efficiently carried out.

Seventh Embodiment

Next, a seventh embodiment of the present invention is described with reference to FIG. 13. The same constituent elements in this embodiment as the constituent elements in the first to sixth embodiments are shown by the the same symbols, and explanation thereof is omitted. Herebelow, structures different from the first to sixth embodiments are mainly described.

Figure 13A:
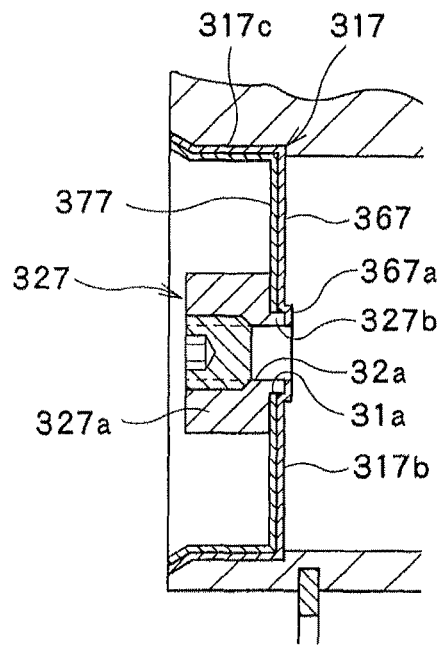
FIG. 13A is a sectional view of an important part of the eccentric oscillation-type gear device including an oil seal cap according to a seventh embodiment of the present invention.

As shown in FIG. 13A, in this embodiment, a body part 317 and a port part 327 of the oil seal cap 30 are different from those of the first to sixth embodiments. The port part 327 includes a port body 327a provided to bear against an outwardly directed surface of a bottom plate part 317b of the body part 317, and a projecting part 327b projecting from the port body 327a to pass through the first hole 31a of the body part 317. The second hole 32a extends over the port body 327a and the projecting part 327b. The second hole 32a is opened, through the first hole 31a, to a side opposed to a side where the port part 327 is provided on the body part 317, in other words, through an inside of the first hole 31a.

In the body part 317, an outer-surface forming part 367, which covers an inner-surface forming part 377 made of metal, has an extension covering part 367a covering a distal end of the projecting part 327b. In this embodiment, a peripheral part of the first hole 31a in a surface of the inner-surface forming part 377 on the side of the closed space S and the projecting part 327b are secured to each other by welding. The welded portion is covered with the outer-surface forming part 367.

Also in this embodiment, the oil seal cap 30 can be attached to the through-hole 4d without any laborious and time-consuming step, as well as an oil passage operation such as a lubricating oil passage operation can be efficiently carried out. In addition, owing to the provision of the projecting part 327b projecting from the first hole 31a of the bottom plate part 317b of the port part 327 (in this example, a hole part of the first hole 31a which is formed in the inner-surface forming part 377), the welding operation of the port part 327 and the body part 317 can be easily carried out in a manufacturing stage. Namely, in this embodiment, a peripheral part of the first hole 31a on the surface of the inner-surface forming part 377 on the side of the closed space S and the projecting part 327b are secured to each other by welding. Since the welding is performed at this portion, the circumferential wall part 317c of the body part 317 does not hinder the welding operation, whereby the welding (securing operation) can be easily carried out. In addition, in the manufacturing stage, by inserting the projecting part 327b to the first hole 31a, positioning of the port part 327 with respect to the body part 317 can be easily carried out.

Figure 13B:
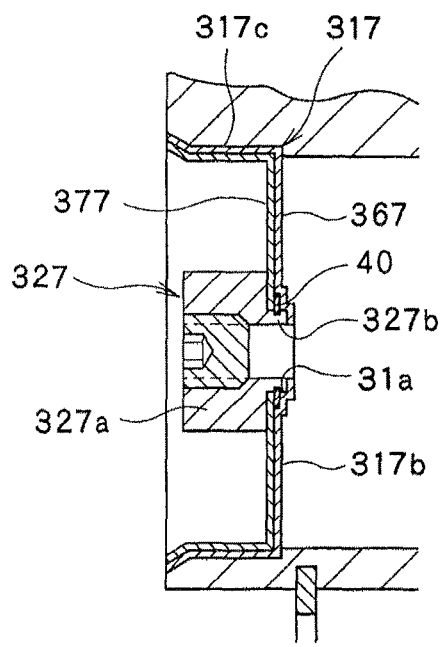
FIG. 13B is a sectional view for explaining a modification example of the seventh embodiment.

FIG. 13B shows a modification example of the seventh embodiment. In this modification example, since a stop ring 40 provided on an outer circumferential surface of the projecting part 327b cooperates with the port body 327a so as to sandwich the inner-surface forming part 377 of the bottom plate 317b therebetween, the port part 327 is provided on the body part 317. The stop ring 40 is covered with the outer-surface forming part 367. Such an embodiment may be employed.

Although some embodiments of the present invention have been described above, the present invention is not limited to the aforementioned embodiments.

For example, although the oil seal cap 30 according to the embodiments is attached to the through-hole 4d in the above respective embodiments, the oil seal cap 30 may be attached to the crank-shaft attachment hole 4e. In addition, the oil seal cap 30 is applied to the eccentric oscillation-type gear device 1 in the above respective embodiments, the oil seal cap 30 may be applied to another device. In addition, in the above first embodiment, the port part 32 has a hexagonal shape, but the port part 32 may have a triangular shape, a rectangular shape, a pentagonal shape, an octagonal shape or the like. In addition, in the second embodiment, the locking part 38b formed of a groove has the first groove part 38b1 and the second groove part 38b2, but the locking part 38b may have only one of the first groove part 38b1 and the second groove part 38b2.

In addition, in the above second embodiment, the second groove part 38b2 has a semicircular shape when viewed in the axial direction of the port part 322, but the second groove part 38b2 may have a fan-like shape. In addition, in the above fourth embodiment, the flange part 314d bears against the chamfer part 4d4, it is possible to employ an embodiment in which the flange part 314d bears against a peripheral part of an outside end of the through-hole 4d.

1 Eccentric oscillation-type gear device
2 External cylinder
3 Internal tooth pin
3a Internal tooth
4 Carrier
4a Base plate part
4d Through-hole
4d1 First hole part
4d2 Second hole part
4d3 Stepped surface
4d4 Chamfer part
4e Crank-shaft attachment hole
5 Base part
7 End plate part
7b Crank-shaft attachment hole
10 Crank shaft
10a First eccentric part
10b Second eccentric part
10c Shaft body
14 First oscillation gear
14a First external tooth
16 Second oscillation gear
16 Second external tooth
30 Oil seal cap
31, 313, 314, 316, 317 Body part
31a First hole
31b, 313b, 314b, 317b Bottom plate part
31c, 313c, 314c, 317c Circumferential wall part
314d Flange part
32, 322, 325, 327 Port part
32a Second hole
32b Internally threaded part
33 Plug member
33b Externally threaded part
33c Operation groove
36, 363, 367 Outer-surface forming part
37, 373, 377 Inner-surface forming part
38a, 38b, 38c, 38d Locking part
38b1 First groove part
38b2 Second groove part
S Closed space

The invention claimed is:

1. An oil seal cap comprising:
a body part having a first hole passing therethrough;
a port part provided on the body part inside an outer circumferential part of the body part when viewed in the passing-through direction of the first hole, the port part having a second hole passing therethrough and extending in the same direction as the passing-through direction of the first hole; and
a plug member configured to block the second hole, the plug member being removably mounted on the port part;
wherein:
the second hole is opened, through the first hole, toward a side opposed to a side where the port part is provided on the body part; and
a surface of at least one of the body part and the port part is provided with a locking part projecting or recessed with respect to the surface.

2. The oil seal cap according to claim 1, wherein:
the body part has a circular shape when viewed in the passing-through direction of the first hole;
an internally threaded part is formed in an inner circumferential surface of the second hole of the port part; and
an externally threaded part is formed on an outer circumferential surface of the plug member.

3. The oil seal cap according to claim 2, wherein
the plug member is provided with an operation groove capable of locking a tool for rotating the plug member.

4. The oil seal cap according to claim 1, wherein
the body part includes a bottom plate part in which the first hole is formed, and a circumferential wall part projecting from an outer circumferential part of the bottom plate part.

5. The oil seal cap according to claim 4, wherein:
the bottom plate part has a circular shape when viewed in the passing-through direction of the first hole; and
the circumferential wall part has a cylindrical shape.

6. The oil seal cap according to claim 5, wherein
the body part further includes a flange part provided on the circumferential wall part to project toward a side opposed to a central side of the bottom plate part.

7. The oil seal cap according to claim 4, wherein
the port part is provided on a surface of the bottom plate part, from which the circumferential wall part projects.

8. The oil seal cap according to claim 5, wherein
the port part is provided on a surface opposed to a surface of the bottom plate part, from which the circumferential wall part projects.

9. The oil seal cap according to claims 1, wherein
the port part has a polygonal shape when viewed in the passing-through direction of the second hole; and
the locking part is made by a corner portion formed on an outer circumferential surface of the polygonal port part.

10. The oil seal cap according to claim 1, wherein
the port part has a circular shape when viewed in the passing-through direction of the second hole;
the locking part is made by a groove formed in an outer circumferential surface of the port part; and
the groove includes first groove part extending from one axial end surface of the port part toward the other end surface along the axial direction, and a second groove part extending in a circumferential direction of the port part from an end of the first groove part on a side of the other end surface of the port part.

11. The oil seal cap according to claim 10, wherein
a pair of the grooves are formed oppositely to each other with a center of the port part therebetween.

12. The oil seal cap according to claim 10, wherein:
the second groove part has a fan-like shape or a semicircular shape when viewed in the axial direction of the port part,
an arcuate portion of the fan-like or semicircular shape is opened from the outer circumferential surface of the port part.

13. An eccentric oscillation-type gear device for transmitting a driving force by converting a rotational speed between a first member and a second member at a predetermined rotational speed ratio, the gear device comprising:
an eccentric part;
an oscillation gear having an insertion hole to which the eccentric part is inserted, and a tooth part;
an external cylinder configured to be attachable to one of the first member and the second member, the external cylinder having an internal tooth to be meshed with the tooth part of the oscillation gear;
a carrier configured to be attachable to the other one of the first member and the second member; and
the oil seal cap according to claim 1;

wherein:
a closed space for accommodating the oscillation gear is defined by the carrier and the external cylinder;
a communication hole in communication with the closed space is formed in one of the carrier and the external cylinder; and
the oil seal cap blocks the communication hole.

14. The eccentric oscillation-type gear device according to claim 13, wherein:
the communication hole has a stepped surface directed outside; and
the oil seal cap is attached to the communication hole in such a manner that the body part bears against the stepped surface.

15. The eccentric oscillation-type gear device according to claim 13, wherein:
in the oil seal cap, the body part includes a bottom plate part in which the first hole is formed, and a circumferential wall part projecting from an outer circumferential part of the bottom plate part;
the port part is provided on a surface of the bottom plate part, from which the circumferential wall part projects;
the body part further includes a flange part provided on the circumferential part to project toward a side opposed to a central side of the bottom plate part; and
the oil seal cap is attached to the communication hole in such a manner that the flange part bears against a peripheral part of an outside end of the communication hole, or a chamfer part formed on the outside end of the communication hole.

* * * * *